US007889065B2

(12) United States Patent  
Smith

(10) Patent No.: US 7,889,065 B2
(45) Date of Patent: Feb. 15, 2011

(54) METHOD AND APPARATUS TO DETERMINE VEHICLE INTENT

(76) Inventor: Alexander E. Smith, 938 Mackall Ave., McLean, VA (US) 22101

( * ) Notice: Subject to any disclaimer, the term of this patent is extended or adjusted under 35 U.S.C. 154(b) by 321 days.

(21) Appl. No.: 12/233,640

(22) Filed: Sep. 19, 2008

(65) Prior Publication Data

US 2009/0174540 A1 Jul. 9, 2009

Related U.S. Application Data

(60) Provisional application No. 61/018,897, filed on Jan. 4, 2008.

(51) Int. Cl.
*B60Q 1/34* (2006.01)
(52) U.S. Cl. ............... 340/465; 340/475; 200/61.27
(58) Field of Classification Search ............ 340/465, 340/476, 463, 468, 475, 477; 348/148, 118; 382/104; 200/61.27, 61.3, 61.31; 701/36, 701/41, 42
See application file for complete search history.

(56) References Cited

U.S. PATENT DOCUMENTS

| | | | |
|---|---|---|---|
| 3,593,272 | A | 7/1971 | Klein |
| 3,665,391 | A | 5/1972 | Bumpous |
| 4,258,353 | A | 3/1981 | Carlson |
| 5,712,618 | A | 1/1998 | McKenna |
| 5,770,998 | A | 6/1998 | Choi |

(Continued)

FOREIGN PATENT DOCUMENTS

EP 1332917 8/2003

(Continued)

OTHER PUBLICATIONS

Beyond Gridlock: Meeting California's Transportation Needs in the Twenty First Century Surface Transportation Policy Project, May 2000.

(Continued)

*Primary Examiner*—Anh V La
(74) *Attorney, Agent, or Firm*—Robert Platt Bell

(57) ABSTRACT

The present invention relates to the field of smart cars and automatic signaling of a vehicle's intent. The invention allows a driver to choose between manual or automatic signaling (turns, deceleration, acceleration) and a prominent feature is that the system is not cooperative and can be phased in over time, one car at a time and offer immediate benefits. Much of the prior art relating to newer automotive technologies relies on the use of cooperative technologies, such as transponders or beacons and the like, requiring all cars to equip in order to gain benefits. While this is technically achievable it is an institutional limitation, and therefore systems that do not rely on this extent of cooperation are more practical and can be introduced sooner. The invention has the capability of ensuring that many more cars on the road provide proper turn signals as well as acceleration and deceleration signals. This display of intent will lead to increased situational awareness for all drivers and will improve efficiencies on the roads leading to less congestion. Today, the car ahead may simply slow down leaving a following or approaching driver to wait and guess what is happening. With this invention the car ahead will declare its intentions in advance. The invention also allows for the broadcasting of the vehicles intentions over commercially available data links.

22 Claims, 4 Drawing Sheets

U.S. PATENT DOCUMENTS

| | | | | |
|---|---|---|---|---|
| 6,429,812 | B1 * | 8/2002 | Hoffberg | 342/357.31 |
| 6,714,127 | B2 | 3/2004 | Perez et al. | |
| 7,102,500 | B2 * | 9/2006 | Martin et al. | 340/477 |
| 7,173,524 | B2 | 2/2007 | Ponzani | |
| 7,243,013 | B2 | 7/2007 | Rao | |
| 7,268,732 | B2 | 9/2007 | Gotzig | |
| 7,342,487 | B2 * | 3/2008 | Del Estal Villar | 340/471 |
| 7,400,237 | B2 | 7/2008 | Cheng | |
| 7,408,455 | B2 | 8/2008 | Ponzani | |
| 7,783,399 | B1 * | 8/2010 | Young et al. | 701/36 |
| 2005/0200467 | A1 | 9/2005 | Au | |
| 2008/0082259 | A1 | 4/2008 | Landschaft | |

FOREIGN PATENT DOCUMENTS

| | | |
|---|---|---|
| EP | 1538025 | 6/2005 |

OTHER PUBLICATIONS

Vehicle Transponder for Preemption of Traffic Lights, NASA's Jet Propulsion Laboratory, Pasadena, California, NASA Tech Brief, Sep. 1, 2006.

In Tysons Corner, Virginia, optimized signal timing reduced delay by approximately 22 percent, http://www.benefitcost.its.dot.gov/ITS/benecost.nsf/ByLink/BOTM-October2006.

Bonnie Cha, CNET, Review of the Garmin Nuvi series of car GPS units, Nov. 20, 2006.

Dylan Bennett. Acceleration Lights, "Stuff of Interest" http://blog.mboffin.com/post.aspx?id=2208, Jun. 12, 2007.

Automotive Lighting, http://en.wikiWikipedia.org, printed Nov. 19, 2008.

NHTSA Technical Report No. DOT HS 808 696 Mar. 1998: The Long-Term Effectiveness of Center High Mounted Stop Lamps in Passenger Cars and Light Trucks.

http://www.rlpengineering.com/, printed Nov. 2008.

Jon Stewart, "Robot cars race around California" Nov. 5, 2007, http://news.bbc.co.uk/2/hi/technology/7078245.stm.

Krumm, SAE 2008-01-1095 "A Markov Model for Driver Turn Prediction" Intelligent Vehicle Initiative Technology Controls and Navigation Systems, 2008, SP-2193 Apr. 14-17, 2008.

Krumm, SAE 2008-01-0201 "Route Prediction from Trip Observations" Intelligent Vehicle Initiative Technology Controls and Navigation Systems, 2008, SP-2193 Apr. 14-17, 2008.

\* cited by examiner

| Trends in Statewide Road Supply and Traffic Demand | | | |
|---|---|---|---|
| Facility Type | 1984 | 1997 | Change 1984-97 |
| Interstate Highways | 13,584 | 14,276 | +5% |
| Other Freeways & Expressways | 6,252 | 7,873 | +26% |
| Principal Arterial Streets | 28,851 | 32,618 | +13% |
| Minor Arterial Streets | 35,240 | 44,472 | +26% |
| Collector Streets | 61,976 | 66,602 | +7% |
| Local Streets | ? | 215,989 | ? |
| TOTAL STATEWIDE | ? | 381,827 | ? |
| Subtotal less Local Streets | 194,590 | 220,608 | +13% |
| Population (millions) | 25.8 | 32.9 | +28% |
| Vehicle Miles Traveled (billions) | 196 | 286 | +45% |
| Source: California Research Bureau; Federal Highway Administration; California Department of Transportation. | | | |

Figure 1 (Prior Art)

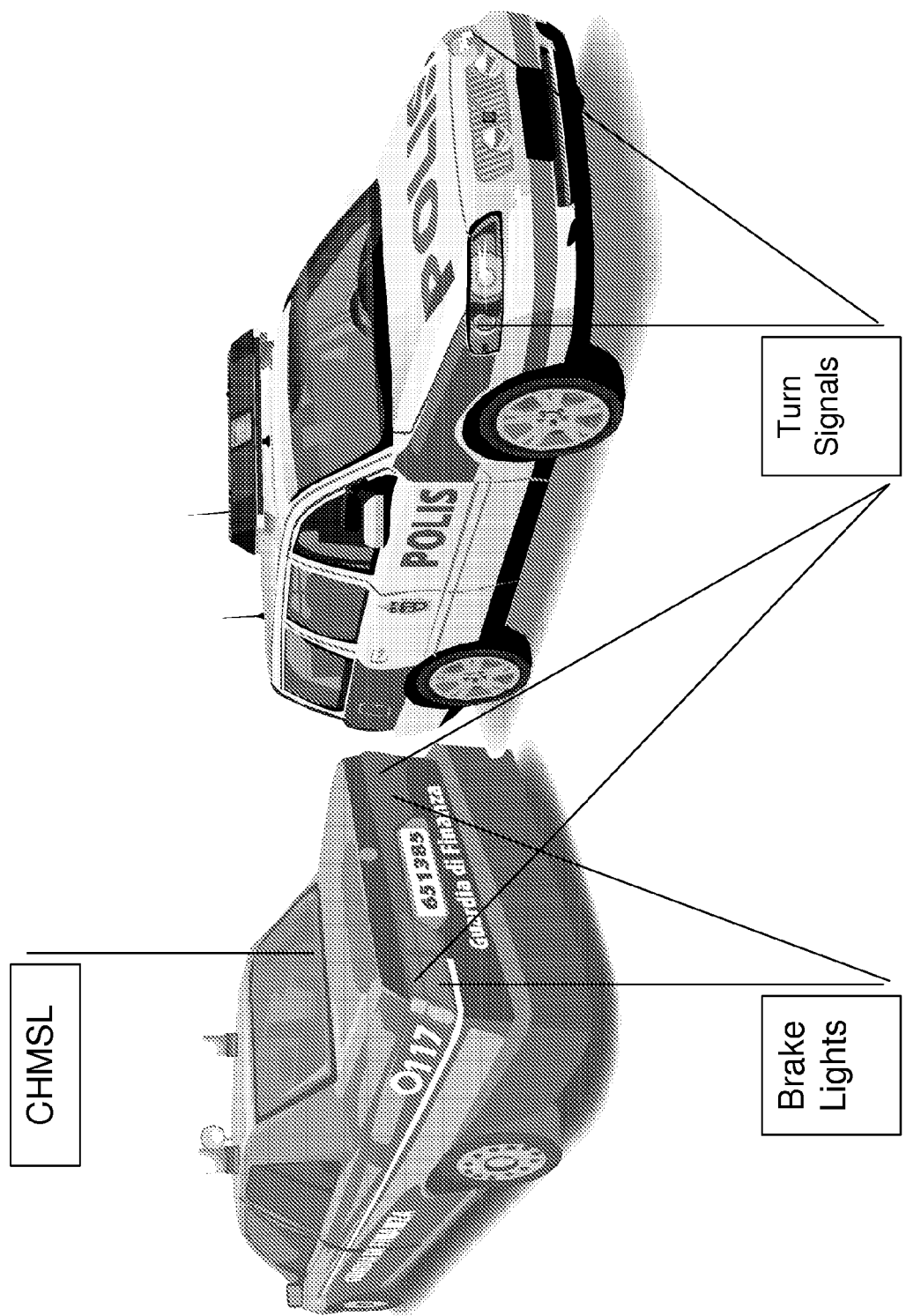
Figure 2. Existing Brake and Turn Signals

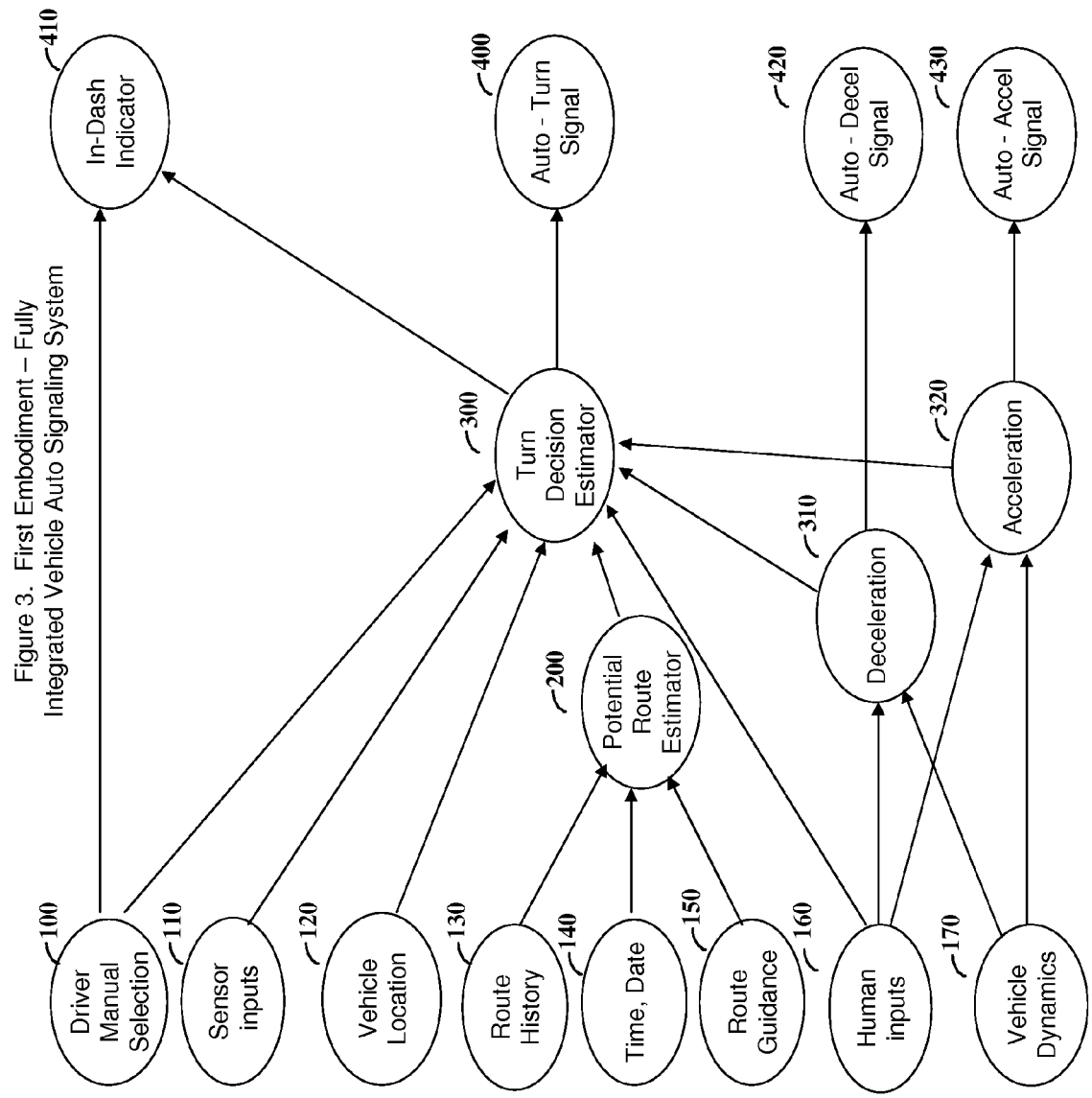

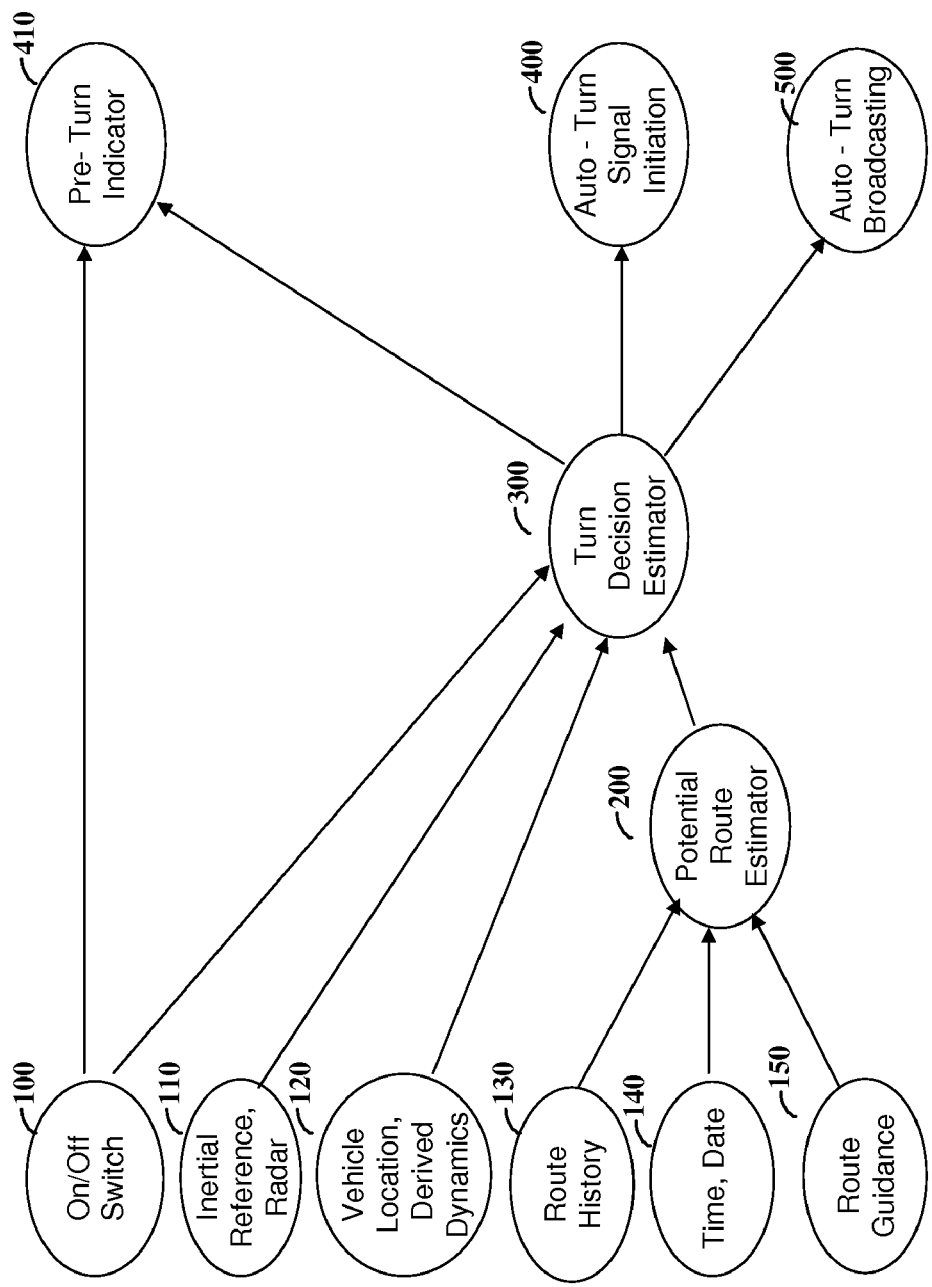
Figure 4. Second Embodiment – Portable Self-Contained Vehicle Auto Signaling System and Data Link Broadcasting

METHOD AND APPARATUS TO DETERMINE VEHICLE INTENT

CROSS-REFERENCE TO RELATED INVENTIONS

The present application claims priority from Provisional U.S. Patent Application Ser. No. 61/018,897, filed on Jan. 4, 2008 and incorporated herein by reference.

FIELD OF THE INVENTION

The present invention relates to the field of smart cars and automatic signaling of a vehicle's intent. The invention has the capability of ensuring that many more cars on the road provide proper turn signals as well as acceleration and deceleration signals.

BACKGROUND OF THE INVENTION

Vehicle traffic continues to grow at a rate that far outpaces the supply of new roads and highways. For example, a study on California roadways, *Beyond Gridlock: Meeting California's Transportation Needs in the Twenty First Century Surface Transportation Policy Project*, May 2000, incorporated herein by reference, provides statistics showing that demand is far outpacing supply. FIG. 1 is an extract from that report, showing that in a 13-year period, the number of vehicle miles traveled increased by 45% while new road facilities increased by 5% to 26% depending on the road type. Therefore, traffic demand increased at approximately twice the rate of new facilities over that period.

Aviation faces the same capacity problem as automobile transportation. With limited concrete, or numbers of runways and airports, the number of flying passengers is estimated to double or triple over the next 20 years, while the number of new airports or runways that are being planned is merely incremental. The aviation industry views new technologies as key to accommodating demand with improved efficiencies and a slow growing infrastructure. For example, by reducing the spacing between aircraft both vertically and horizontally, more aircraft can use the same block of airspace. Newer, more accurate, aircraft tracking technologies will allow for this reduced spacing. On airport surfaces, accurate tracking combined with decision support tools will allow more aircraft to use existing airport gates more effectively.

Automobile transportation may also benefit from new technologies that allow for more cars to use existing roads and facilities more efficiently. For example, these technologies may include smart traffic lights, vehicle transponders and other on board systems. Cooperative technologies receive a lot of attention for potential future vehicle applications. Pioneered in commercial aviation, use of on-board cooperative devices, such as transponders, allows for the communication of intent between users and third parties. In aviation, all aircraft are required by law to carry transponder devices in regulated airspace for applications such as surveillance and collision avoidance. With something like 10,000 commercial and 250,000 general aviation aircraft in existence today, this is regulated by law, mainly because aviation is inherently global and governments have heretofore been responsible for air traffic control.

For example, a vehicle transponder for pre-emption of traffic lights, is presented in a NASA Tech Brief, dated September 2006, and incorporated herein by reference. That tech brief describes when the unit at an intersection determines that this vehicle is approaching and has priority to preempt the intersection; it transmits a signal declaring the priority and the preemption to all participating vehicles (including this one) in the vicinity. If the unit at the intersection has determined that other participating vehicles are also approaching the intersection, then this unit also transmits, to the vehicle that has priority, a message that the other vehicles are approaching the same intersection. The texts of these messages, plus graphical symbols that show the directions and numbers of approaching vehicles are presented on the display panel of a computer that is part of the transponder.

While these systems have been designed, built and no doubt work effectively, the problem with full-scale implementation is institutional and not technical. The big issue with cooperative devices is that all vehicles need to be equipped to provide benefits overall. As in aviation, if one vehicle in a particular scenario is not equipped, the entire system is rendered useless and may be unsafe. Thus a need exists in the art for a system which is not cooperative in order to maximize benefits and operate in a mixed equipage scenario.

The U.S. DOT reported on the benefits of smarter traffic light management in a 2006 report, presented on http://www.benefitcost.its.dot.gov/ITS/benecost.nsf/ByLink/BOTM-October2006, incorporated herein by reference. In the Tysons Corner area of Northern Virginia, approximately 40 signalized intersections were connected to a temporary operations center. In the control room, operators monitored traffic conditions and retimed signals as necessary to improve traffic conditions. The DOT analysis estimated the system saved motorists approximately 20 million dollars annually. Stops were reduced by approximately 6 percent (saving 418 thousand dollars), system delays decreased by an estimated 22 percent (18 million dollars), and fuel consumption improved by an estimated 9 percent (1.5 million dollars). Total annual emissions of CO, NOx, and VOC were decreased by an estimated 134.6 thousand kilograms.

Other new technologies proposed for vehicle traffic management include the use of so-called intelligent beacons. U.S. Pat. No. 6,714,127, entitled Emergency Warning Intelligent Beacon System for Vehicles, incorporated herein by reference, describes a beacon system located at various points of interest to transmit local information to nearby motorists. Potential uses of the system include a speed limit beacon installed on a speed limit sign to reflect current or recommended speed limit based on weather conditions, ice, rain, potential hazards, etc. Another use is as a fog zone beacon installed in known fog zone areas where motorists are alerted of fog zone conditions ahead. Other uses of beacons include announcing freezing bridge surfaces, frozen road surface conditions, railroad crossings, and the presence of hazardous materials.

Use of radar sensors for various vehicle applications is well described in the prior art. Radar sensors are usually used to assist parking, monitor blind spots, anticipate collisions, starting and stopping operation or during driving with distance monitoring, and to regulate separation through cruise control operation. U.S. Pat. No. 7,243,013, entitled Vehicle Radar-Based Side Impact Assessment Method, incorporated herein by reference, describes the use of radar sensors using a single radar sensor mounted on each side of the vehicle to generate a range and range-rate value for detected target objects, and a controller coupled to each radar sensor. The controller calculates estimated target object speed, angle of the target object line of travel, and a shortest distance value from the sensor to the target object line of travel, and compares the shortest distance value and a change in the angle value to respective threshold values for potential collision threat assessment.

U.S. Pat. No. 7,268,732, entitled Radar Sensor For Use With Automobiles, incorporated herein by reference, describes the use of a different frequency band and modulation technique to monitor the near field region around a vehicle. This patent also states that current radar sensors are normally used for remote object detection, and that, for near field observations, high spatial resolution is important for separation as well as angle, whereas the angular information is less important for large separations. For monitoring of separation at large range, radar sensors are conventionally used having a frequency of approximately 76 Gigahertz. These frequencies have some disadvantages, however, and frequencies of approximately 24 Gigahertz are better for near field monitoring.

On-line magazine CNET offers reviews of various new consumer electronics items, including one by Bonnie Cha, of the Garmin Nuvi series of car GPS units, published on Nov. 20, 2006 and incorporated herein by reference. The reviewer notes many newer features are now being integrated with GPS devices such as Bluetooth, so it can be used hands-free to make and accept phone calls. If a number is listed for a point of interest, the Nuvi 660 model can dial out to that business with a press of a button and traditional voice-guided directions are automatically muted during incoming calls. There are also options to send text messages, synchronize cellular phone address books and call log, and dial by voice. The reviewer commented that among of the greatest perks and differentiators about the Garmin Nuvi 660 are its travel features. It has an onboard travel kit that includes an MP3 player, an audible book player, a JPEG picture viewer with a slide-show function, a world clock, currency and measurement converters, a calculator, and support in various languages and dialects. Like most of the units on the market the maps are available in 2D and 3D view with day and night colors, and the view can be changed so that either north or the direction of travel or always at the top of the screen. Plus and minus icons on the map screen allow you to zoom in and out, and there's also a trip information page that displays car speed, direction, trip time, and so forth. The Nuvi 660 has a database with all the major categories and more specific ones; one can search for restaurants by type of cuisine, for example. While, as for the mobile phone industry, features are constantly added to in-car GPS units, these features are mainly limited to the somewhat obvious addition of user applications that run on the GPS unit's processor, with a lesser degree of integration to the GPS unit's main routing and guidance functions.

New technologies envisioned for vehicles also include the use of signaling. In the weblog blog.mboffin.com/post.aspx?id=2208, on June 2007, incorporated herein by reference, the participants in the forum discuss the idea of using various lights to show the driver's use of controls. For example, the question is posed that "you have brake lights to know when someone has their foot on the brake pedal, so why not acceleration lights to know when they are pushing on the accelerator pedal?" In this example, the posters go on to discuss variable headlight intensity related to the car's acceleration, based on acceleration pedal movement. However, they quickly point out all of the impracticalities of such a scheme due to variations in different car headlamp intensities, not to mention differing ambient light conditions.

In recent years, some signaling lights have been added to cars including the third center brake light, as shown in FIG. 2, and the use of indicator lights on car mirrors and side panels. According to Wikipedia.org, incorporated herein by reference, in 1986, the United States National Highway Traffic Safety Administration and Transport Canada mandated that all new passenger cars have a Centre High Mount Stop Lamp (CHMSL) installed. Referred to as the center brake light, or the "Dole light," after the then-Secretary of Transportation, Elizabeth Dole, this light provides a deceleration warning to following drivers, whose view of the braking vehicle's regular stop lights is blocked by interceding vehicles. It also helps to distinguish brake signals from turn signals in North America, where red rear turn signals identical in appearance to brake lights are permitted. According to NHTSA Technical Report Number DOT HS 808 696: The Long-Term Effectiveness of Center High Mounted Stop Lamps in Passenger Cars and Light Trucks, by Kahane, Charles J. and Hertz, Ellen (1998), incorporated herein by reference, the CHMSL is credited with reducing collisions overall by about 5%.

Bavarian Motor Werks, of Germany, has implemented a technology known as "adaptive brake lights" where the intensity or number of brake lights illuminated is altered depending upon the type of braking. In a normal braking situation, standard brake lights meeting DOT or other requirements are activated. However, in a panic stop (as measured by pedal pressure or accelerometers) additional brakes lights are illuminated and/or existing brake lights are illuminated at a higher intensity to better catch the attention of a following driver.

Landschaft, Published U.S. Patent Application No. 2008/0082259, incorporated herein by reference, discloses a technique for activating a turn signal based on a defined route and a GPS location. The primary purpose of the invention is to signal the driver of the vehicle, using the vehicle's own turn signals, of an upcoming turn, so that the driver is not distracted reading a GPS display. The signaling of other drivers is a secondary consideration. Second, the system relies upon a predetermined path being followed, according to a GPS navigation system. Thus, the system only works when a driver is following a route programmed into a GPS system.

This system has a number of obvious flaws. For example, a very small percentage of trips are made using the GPS system as a guide. GPS systems often provide wrong or misleading instructions, and moreover, a driver may decide to take a different route for various reasons, including road construction, detours, or desires to visit other destinations. In such instances, the Landschaft reference may generate erroneous turn signals, as there does not appear to be any means for correction. Landschaft also discloses a technique for measuring distance to a turn and determining, based on a geographical database, when to activate the turn signal. However, he does not teach or suggest any technique for activating turn signals in situations where the route has not been pre-programmed in a GPS system.

A number of patents exist which teach the concept of a signaling device for indicating when a vehicle is decelerating, even if the brakes are not being applied. Cheng, U.S. Pat. No. 7,400,237, incorporated herein by reference, discloses a deceleration detector and indicator. Bumpous, U.S. Pat. No. 3,665,391 is similar to the Cheng patent. Goetscchalckx, EP Patent 1332917, incorporated herein by reference, discloses a display that displays speed and acceleration/deceleration to vehicles. Debaillie, EP Patent 1538025, incorporated herein by reference, discloses a similar system to Goetschalckx but using GPS to determine speed. These references merely indicate speed and/or acceleration and/or deceleration to motorists behind the vehicle, even if brakes have not been applied. These types of devices have already been applied to some busses and trucks in the form of a yellow "deceleration" light. However, such device do not indicate direction of turns.

Au, Published U.S. Patent Application 2005/0200467, incorporated herein by reference, discloses an automatic signaling system using a processor and a "sensor." The "sensor"

12 comprises a CCD camera which detects vehicle position optically, by detecting the location of roadway lane markers. The processor then determines if a lane change is occurring and activates the turn signal accordingly. The invention has some obvious limitations. It indicates a lane change only after it has started. It appears also to be limited to lane changes, and not to intersection signaling. The invention requires a camera and optical imaging software. Applicant is aware of similar technology incorporated into newer model cars (e.g., 2009 BMW 7-series) that alert a driver of a lane change using optical imaging. However these devices do not appear to automatically generate signals to other drivers, and moreover can only detect a lane change (and not a turn) after it has commenced.

McKenna, U.S. Pat. No. 5,712,618, incorporated herein by reference, discloses an automatic signaling device which generates a pedestrian or vehicle warning based on wheel speed and turning angle to generate signals or warnings when turns or lane changes occur. Again, it would seem that this device is somewhat primitive and can generate a signal only after the turn has commenced (as evidenced by turning angle). McKenna does not teach or suggest a technique to anticipate a turn before the steering wheel is turned.

RLP ENGINEERING discloses a technique for activating turn signals automatically. The primary thrust of their invention appears to be a mechanism for turning OFF turn signals based on vehicle sensors, rather than using the traditional mechanical mechanism, thus reducing part count and complexity. The RLP ENGINEERING website (incorporated herein by reference) disclose, somewhat vaguely, a technique for "reminding" a driver to use his turn signals. It is described as a system that reminds the driver to use turn signals by monitoring the vehicle dynamics, detecting specific turns and comparing if the turn signal was properly utilized in the turn. This is not to be confused with turn signal reminders that are currently on vehicles to remind drivers to shut off a "stuck on" turn signal. This is a system that makes the driver a better driver by encouraging the appropriate use of turn signals.

When a driver repeatedly neglects to use the turn signal, then that driver will eventually receive a short duration display suggesting: "USE SIGNAL NEXT TURN". Subsequent improvement of turn signal usage habits will eliminate the driver's display messages and thus the driver's turn signal habits are improved. Drivers who consistently use turn signals will never receive a drivers display message and this is an extremely important aspect of the feature. This means that most all drivers will not consider this vehicle feature a nuisance. Occasionally, even good drivers may become distracted while driving and therefore may occasionally neglect the proper use of the turn signal. In this case, the driver's display message will serve to notify the driver to maybe pay more attention to the task of driving.

RLP Engineering further discloses a Turn Signal Reminder For Lane Departure Warning. Present Lane Departure Warning Systems (LDW) have the positive side effect of causing the driver to use the turn signal for lane changes. However, LDW systems are engaged at a threshold speed over 45 mph or so, depending on the manufacturer's design. The warnings for lane shift without the use of a turn signal are instant, abrupt and grab the driver's attention in order that the driver may bring the vehicle back into its proper lane. If intentional lane shifts are accompanied by the turn signal, then no warning is given.

RLP Engineering has a patent pending that would monitor lane change performance at the speeds below the 45 mph threshold. If the driver repeatedly neglects to use the turn signal at these lower speeds, then the driver will eventually receive a display message such as "SIGNAL LANE CHANGES". This is not an abrupt warning, but a user friendly suggestion to the driver to use turn signals for all lane changes, not just a higher speeds.

From the description on the RLP ENGINEERING website it appears that the system does not automatically generate turn signals, but rather nags the driver to use them. It appears that rather than predicting turns, it determines when a turn occurs and then watches for lack of turn signal use and then reminds the driver after the fact to train the driver.

Richard Ponzani of RLP ENGINEERING has at least two patents issued related to this technology. U.S. Pat. No. 7,408,455, incorporated herein by reference, discloses his "Electronic Intelligent Turn Signal Control System" which is claimed to turn ON and OFF turn signals in response to vehicle sensors. However, again, this is a sensor based on wheel speed and turn angles (or yaw measurement) not prediction of turns. U.S. Pat. No. 7,173,524, incorporated herein by reference, also is directed toward an "Electronic Intelligent turn signal control system" but this application appears to be directed only toward the turn-off feature for signals left on. Ponzani has a number of other automotive applications pending, but they do not appear to be related to turn signals.

Taking the use of onboard systems and the smart car concept to a logical conclusion, there is talk of cars that drive themselves. In an interview with the British Broadcasting Corporation (BBC) on Nov. 5, 2007, published on BBC.co.uk and incorporated herein by reference, Larry Burns, GM's vice-president for research and development and strategic planning, stated that self-driving cars could be on the road by the year 2015. That article also included a description of a competition held for 11 driverless cars that had to navigate around a 60 mile course without operator intervention. The cars had various sensor devices onboard including radar and Lidar (light detection and ranging), GPS navigation, and databases. A number of competitions have been held to test such automated cars, and Universities, such as Carnegie Mellon, have spent considerable resources developing such test vehicles. However, it does not appear that such automated vehicles will be ready for the road in the near future. Moreover, such vehicles do not appear to generate turn signal indications when a human driver is driving.

John Krumm (Microsoft Research Corporation) has written two papers for the Society of Automotive Engineers (SAE) which are relevant to the background of the present invention. These papers were published after applicant's effective filing date, and thus are not "Prior Art." SAE technical paper 2008-01-1095 entitled "A Markov Model for Driver Turn Prediction" (Intelligent Vehicle Initiative Technology Controls and Navigation Systems, 2008, SP-2193 Apr. 14-17, 2008) and SAE technical paper 2008-01-0201 entitled "Route Prediction from Trip Observations" (Intelligent Vehicle Initiative Technology Controls and Navigation Systems, 2008, SP-2193 Apr. 14-17, 2008) are both incorporated herein by reference.

In the first paper, Krumm describes an algorithm for making short-term route predictions for vehicle drivers. The Markov model is trained from the driver's long term trip history from GS data. Krumm envisions his device being used to include driver warnings, anticipatory information delivery, and various automatic vehicle behaviors including automatic turn signals (Krumm, page 1). Krumm does not attempt to determine an entire trip route in this first paper, but rather only immediate segments. While Krumm mentions "automatic turn signals" as one of the possible applications of his device, he does not state how the device would be used for such an application.

In the second paper, Krumm discloses a method of route prediction from trip observations. Unlike the first paper, Krumm here is discloses a technique for end-to-end route prediction based on GPS observation of past trips. Krumm does not disclose this embodiment being used for automatic turn signals, but rather for other applications, including optimizing hybrid vehicle recharging patters (Krumm, Page 1).

SUMMARY OF THE INVENTION

The present invention relates to the field of smart cars and automatic signaling of a vehicle's intent. The invention allows a driver to choose between manual or automatic signaling (turns, deceleration, acceleration) and a prominent feature is that the system is not cooperative and can be phased in over time, one car at a time and offer immediate benefits. Much of the prior art relating to newer automotive technologies relies on the use of cooperative technologies, such as transponders or beacons and the like, requiring all cars to equip in order to gain benefits. While this is technically achievable it is an institutional limitation, and therefore systems that do not rely on this extent of cooperation are more practical and can be introduced sooner.

The invention has the capability of ensuring that many more cars on the road provide proper turn signals as well as acceleration and deceleration signals. This display of intent will lead to increased situational awareness for all drivers and will improve efficiencies on the roads leading to less congestion. Today, the car ahead may simply slow down leaving a following or approaching driver to wait and guess what is happening. With this invention the car ahead will declare its intentions in advance. The invention also allows for the broadcasting of the vehicles intentions over commercially available data links.

BRIEF DESCRIPTION OF THE DRAWINGS

FIG. 1 is a table showing trends in statewide road supply and traffic demand.

FIG. 2 is a drawing showing the current use of lights for signaling on automobiles.

FIG. 3 is a block diagram of the first embodiment of the present invention, which is a fully integrated vehicle auto signaling system.

FIG. 4 is a block diagram of the second embodiment of the present invention, which is a portable vehicle auto signaling system.

DETAILED DESCRIPTION OF THE INVENTION

Referring to FIG. 3, in the first embodiment of the present invention, a system is shown for displaying driver intent using various light or lamp signals on the vehicle. This embodiment is a fully integrated system, which interfaces with various other existing vehicle systems. The inputs to the system include sensor inputs 110 which may include Radar, Lidar, or other vehicle sensors (speed, turn angle, acceleration/deceleration, braking, and the like), as well as the vehicle's location 120 which may be derived from satellite navigation, inertial reference or other means. The vehicle may then estimate the potential routes 200 to be taken by the driver based on a combination of route history previously taken 130, time of day and date 140, and actual route guidance 150. For example, the potential route estimator 200 may have a high degree of confidence in routes taken during the week at certain times pre-established times such as driving a child from home to school or a work commute.

Sensor inputs 110 may comprise inputs from a number of existing vehicle sensors or sensors installed specifically for the present invention. Radar cruise controls and parking sensors, for example, may be used to detect the presence of vehicles ahead or behind. Other onboard systems such as Supplemental Restraints (SRS), Cruise Control, Rollover Protection, Hill Descent Control, and the like, may output data indicating speed, steering wheel turn angle, acceleration and deceleration, braking status and the like. Increasingly, auto manufacturers are storing such data in a "black box" so it may be analyzed for post collision analysis. The various electrical devices described here may be interfaced to one another through a vehicle data bus or the like. Thus, retrieving data from vehicle sensors may be as simple as accessing the vehicle data bus and downloading the necessary data.

Vehicle location 120 may be obtained from a GPS or inertial navigation system or the like. Again, such devices may be interfaced to one another through a vehicle data bus or the like. Thus, retrieving data indicating vehicle position may be as simple as accessing the vehicle data bus and downloading the necessary data. Alternately, vehicle location 120 may be derived from a dedicate vehicle location device, such as GPS system integrated into the present invention.

Route history 130 keeps track of past vehicle routes. Many motorists spend a large percentage of their driving following the same routes to and from work, shopping, school, and other locations. Hence, route history 130 can be a reliable indicator of an intended path to be taken. At different times or on weekends or national holidays the degree of confidence may be lower, as a user might be taking a route which may comprise a partial path to work, but veers off to another destination. However, even on weekends or holidays, many drivers follow certain driving patterns, to vacation homes, restaurants, or shopping. Thus, typical routes may emerge which a driver follows over and over again. Route history 130 tracks these routes and keeps track not only of the routes themselves, but their frequency of use, time of day of use, and also day of week of use.

Thus, for a typical driver, a pattern may quickly emerge of the same route being followed Monday through Friday, between the hours of 6:00 and 8:00 AM, while a reverse route is followed between the hours of 5:00 PM and 9:00 PM. This primary commuting route may be the most prevalent route for most drivers. Secondary routes, for example to shopping or dining, may emerge during after-hours or weekends. For those who do not commute, other routes may emerge as patterns, such as to and from school, day care, soccer practice, shopping, or the like.

Route history 130 may store routes based on frequency of use and also date of last use. When memory of route history 130 becomes nearly full, older routes that have been used less frequently may be deleted. For example, a route that is followed only once that is more than a month old may be deleted. However a route that is used frequently may be stored and retained, even if it is more than a month old. A triage system using predetermined or learning criteria may be used to delete routes dynamically such that relevant routes are kept and less relevant routes are deleted. Note that even if a route is deleted and then later used by the driver, the system merely re-learns the route. Thus, for example, if a driver changes driving habits, new routes may be stored and old routes will eventually fall off the routing map data.

Time of day and date 140 may be taken from a number of sources. Many automobiles have an onboard clock, which may be set manually. Other automobiles use clock data from GPS links and the like, which may be updated automatically for time zone (based on GPS location) and daylight savings time and the like. Such clock systems can determine time of day, date, and day of the week, using a simple calendar program, and may also determine whether a holiday is present using a similar calendar, which may be altered for City, State, Country, or the like, based on GPS position. Thus, time of day and date 140 can generate data, which can determine whether it is a work-day or a holiday or a weekday or a weekend. Moreover, this data may be used to determine whether it is a peak commuting time or the like.

Route guidance 150 may comprise, for example, any one of a number of known navigation systems, either built-in to a vehicle or added as an aftermarket accessory. Such systems are well known in the art and generally use GPS, inertial navigation, or a combination of the two or other means, to determine vehicle location. Such systems are capable of generating maps for display to a user, and also generating routes for a driver to follow. Such routes may be displayed visually, or verbally, or a combination of both.

At the present time, most drivers use such routing only for trips to unfamiliar destinations or through unfamiliar areas where correct routing is not well known. However, advanced routing systems are available which select routing based on traffic congestion and other considerations, and thus may be used by even those following a regular routing (commuting) in congested cities and the like. Using voice recognition software, a driver may tell the vehicle his intended destination, even for a local trip or commute (verbal commands such as "Office", "Grocery Store" or the like, or may mention a specific destination by address or name). The route guidance 150 not only programs the route but receives traffic congestion data to plot the fastest or easiest route, based on local traffic conditions. Route guidance can thus form a larger number of trips used by a driver in the near future.

Turn decision estimator 300 combines the outputs from the potential route estimator 200, sensor inputs 110, and human inputs 160, which include control inputs such as gear changing, pedal movement, cruise control operation, throttle position, turn signal operation and so on. Deceleration 310 and acceleration 320 are also input the turn decision estimator 300. For example, if a vehicle is decelerating toward an intersection when there is no stopped or decelerating vehicle ahead, then it is more likely that the driver intend to make a turn. Deceleration and acceleration 310 and 320 may be readily obtained from existing on board sensors used for dynamic vehicle control, air bag activation, inertial guidance system, GPS system, or the like. Alternately, a dedicated sensor, such as a solid-state accelerometer may be used.

Human inputs 160 may include control inputs such as gear changing, pedal movement, cruise control operation, throttle position, turn signal operation and so on. Again, these inputs may already be present in a modern automobile and obtaining such data may be a simple matter of accessing the vehicle data bus for such data. Vehicle dynamics 170 can be sourced from a combination of satellite navigation or other inertial or gyro sensors, many if not all of which may be present already in a vehicle and whose data may be readily accessed from a vehicle data bus.

Potential Route Estimator 200 may make a probability decision as to whether the vehicle is following a particular route. Potential Route Estimator 200 may be programmed through the use of a learning algorithm or neural network. Each input node (e.g., 130, 140, 150) to turn signal estimator 200 may be weighted with a value representing the likelihood of a route is being followed. Thus, for example, if the time and date 140 is a Monday morning on a non-holiday date, a high weighting factor may be provided to a potential route output from potential route estimator 200 that the route followed may comprise a prior commuting route from route history 130. If however, the time, date 140 indicates that the time is 4:00 PM on a holiday weekend, the likelihood that the driver is following a commuting path may be low and such a path may be given a low weighting.

Route history 130 may also be used to weigh itself. For example, if a driver follows a route known in route history, the more the driver follows that stored route, the higher the probability the stored route is indeed the route the driver intends to follow. Thus, for example, even if a driver is driving on a holiday weekend, if he follows the route to his office, it may be assumed, the further he follows this route, that that is the intended destination. The weighting of this route as a likely route will thus increase as the trip progresses. If however, the driver deviates from the route or cancels a proposed signal via manual selection 100, then the weighting may fall off rapidly, as it is clear that is not the route the driver intends to follow.

On the other hand, if the user programs in a route into his GPS navigation system (Route Guidance 150) it may be assumed that such a route has a higher likelihood of being the correct route and may be weighted to override other possible routes, regardless of time of day or route history. The probability that a programmed GPS route is the correct route thus becomes 1.0 (100%) unless weighted down by divergence in actual vehicle path. In a neural network scenario, the weighting factor of the programmed GPS route is automatically assigned the highest or nearly highest weighting factor, until subsequent feedback (overridden signals, missed turns) alters such weighting factors.

Turn decision estimator 300 takes output from all inputs 100-170 and potential route estimator 200 may make a probability estimation, using the input data and a learning algorithm or neural network to decide whether a turn is likely to occur. The turn decision estimator may then power an in-dash indicator 410 to inform the driver that a turn signal 400 will be given in a short period of time, for example with 2-3 seconds of initiating the in-dash indication 410. This gives the driver the opportunity to override the impending turn signal via driver manual selection 100 for any reason. Thus, if the system erroneously indicates a turn is to occur, the human driver through manual selection 100 can override the signal before it starts, to prevent erroneous signals. The system may also be set to merely remind the driver to signal ahead of time, based on the decisions of the turn decision estimator and allow the driver to positively activate the turn signal if desired.

Note that the term "override" is used here to describe the operation of a driver vetoing the automatic signal generated by the system. The term "cancel," when used in conjunction with turn signal technology, is a term of art and generally refers to the turning off of a turn signal once a turn or lane change has been completed. To avoid confusion with the term "cancel", the present application uses the term "override" to describe the driver preventing the automatically generated signal from being generated, by vetoing the signal during the indication time period immediately before the signal is actually generated (e.g., 2-3 seconds) or the driver canceling (in the traditional sense) the signal once is has started, but before any turn is accomplished.

Manual input 100 also allows the driver to switch on or off the auto turn mode, in case it is not needed or is distracting. For example, when using the system the driver may be planning a completely new route and may wish to disable the auto turn signal function. That new route may then be stored in the invention's route history 130 for later use in turn decision estimation.

The system may also be used to cancel manually initiated turn signals that have been inadvertently left on by the driver.

Once a turn has been completed, the system can determine the turn is done by using route estimator 200, or vehicle location 120. If route estimator 200 indicates the vehicle is on an estimated route and the turn is completed, it may cancel a signal automatically or manually generated. If vehicle location 120 indicates that the vehicle is no longer in a turning location, it may also cancel a turn signal. Note that the term "cancel" is used here in the traditional sense of canceling a signal generated.

There may be situations where a driver wishes to use a signal manually and the system does not understand why the signal is being used. For example, a driver may wish to signal a driver of an impending turn or lane change, even though such a turn is not contemplated for some time or the lane change is not required to follow an estimated or guidance route. In such situations, the driver may override any automatic cancellation by holding down on the turn signal, or by other means (hitting the turn signal lever or switch twice, to indicate an override turn signal).

If the manual selection 100 overrides a turn signal generated by turn decision estimator 300 (or alternately fails to override a signal), this feedback may be used to "train" the neural networks or learning algorithms in turn decision estimator 300 and potential route estimator 200. Feedback in a neural network is used to reinforce programming by adjusting weighting factors for each input node. Thus, if turn decision estimator 200 generates an auto-turn signal 400 and the human selection 100 fails to cancel this signal, this feedback may reinforce the learning of the system by indicating a correct decision was made. Similarly, if human input overrides the signal (as being erroneous) the system learns it has made a mistake. Weighting factors for each input to the network can be adjusted accordingly, and the operation of the system will improve over time as it "learns" the habits of the driver.

In addition, the system can also "learn" by monitoring whether a turn has indeed been made. If an auto-turn signal 400 is generated and the vehicle does not turn (as indicated by vehicle location 120 and route history 130) then the system "learns" it has made a mistake by indicating a turn that did not occur. Weighting factors for the various inputs can be adjusted accordingly.

Using a combination of human inputs 160 and vehicle dynamics 170, the system can also determine whether the vehicle is accelerating 320 or decelerating 310, and can power signals on the front and back of the vehicle 420, 430. Such acceleration/deceleration indicators can indicate to other vehicles whether the vehicle is slowing down (for a turn, for example) or speeding up (to pass through an intersection). Detecting whether a vehicle is speeding up or slowing down requires a fine degree of depth perception for other drivers, and oftentimes this depth perception diminishes with age. The use of a signal light (yellow for deceleration, green for acceleration) can allow other motorists to readily determine whether a vehicle ahead or behind is accelerating or slowing.

Acceleration and deceleration inputs 310 and 320 may also be used by turn decision estimator 300 to help determine whether a turn is about to occur. For example, if the vehicle starts to decelerate close to an intersection, the likelihood that a turn is about to occur is increased. The system may interface with traffic monitoring systems to input traffic signal light conditions so as to avoid confusion with deceleration for a red light from deceleration for a turn. Thus, for example, if the system is indicated that a green light is ahead, but the car is decelerating, it may be inferred that a turn is about to occur. Sensor inputs 110 including Radar, Lidar, or other devices, often already present on a vehicle (e.g., radar cruise control) may be used to determine whether the vehicle is slowing down merely because another vehicle or obstruction is present. If so, then a turn signal may not be warranted. Whether such a turn is left or right may be determined from lane location, which may be obtained from vehicle location 120 (e.g., GPS) or from lane tracking apparatus known in the art. If a vehicle is accelerating (or failing to decelerate) toward an intersection where only a green arrow is present, the system may decide that a turn in that direction is predicted.

Unlike the Prior Art turn signal devices discussed above, the present invention is capable of generating turn signals in advance of an actual turn. The devices of the Prior Art require that a lane change be initiated (as indicated by lane monitoring devices), or that steering angle be changed before a signal is activated. In such situations, the signal may be too late, as other cars are not warned in advance of an impending turn by the vehicle. The present invention, by predicting a vehicle turn based on past routes, route guidance, and even vehicle deceleration or acceleration, can activate the turn signal automatically before the turn is made. Even in a mode where the system reminds the driver of a turn signal, the system presents an advantage over the Prior Art. Note that the present invention may also be used in combination with Prior Art devices to enhance the performance of such devices.

Note that route prediction alone may be insufficient to determine whether a vehicle is turning at a given intersection. Many suburban residents live in communities located some distance from work, shopping, and other activities. Traveling to any of these activities may require following a fixed route for a first portion of the trip. Thus, leaving a development, getting on an interstate highway, and getting off at a certain exit may be common links in stored GPS paths for work, shopping, and other types of trips. Route prediction, such as that disclosed by Krumm, while a powerful tool, may not be sufficient in and of itself sufficient to generate automated turn signals with any reliability if various historical routes all include the same starting segments.

The present invention, by using multiple sources of data for turn prediction, can improve upon the accuracy of mere route prediction for automatic turn signal usage. Route prediction may predict a turn at a given intersection, and this prediction may be given a first weighting value. However, other inputs, such as vehicle dynamics, sensor inputs, and human inputs may outweigh a predicted route, if it is apparent the driver is not slowing down, downshifting, or braking for a turn, for example.

FIG. 4 illustrates a second embodiment of the invention, which comprises a portable stand-alone unit. This unit could be completely stand-alone or available as a function in a portable satellite navigation unit. The system has an on/off switch 100 and may have built in sensors 110 such as an inertial unit or a radar sensor. For example, the radar sensor could be affixed to the rear of the unit so may scan the roadway ahead when the unit is placed on the dashboard of the vehicle. Vehicle location 120 and route history 130 may be determined by satellite navigation. As for the first embodiment, the combination of route history 130, time and date 140, and route guidance 150 may provide for estimates of the potential route to be taken by the driver 200. The potential routes 200, combined with sensor readings 110, and vehicle location 120 provide estimates of upcoming turns. The inertial 110 and vehicle dynamics derived from satellite navigation 120 provide deceleration and acceleration estimate to the turn decision estimator. The pre turn indicator 410, built into the portable unit will then indicate that a turn signal will be made within a selectable period of time, of say 1-3 seconds, and then the turn signal will start 400. Since the unit is portable and not fully integrated with the vehicle it may send a turn signal initiation to the vehicle over a data link such as blue tooth or through a USB or other hardwired interface. Once the turn decision has been made it will also be available for broadcasting 500 over any standard data link to nearby vehicles.

Broadcasting 500 may be applied in both embodiments, to broadcast turn signal data and other data via data links to other vehicles, much in the same manner aircraft communicate with one another using transponder data or ADS-B data. Vehicle identification (VIN number or license number or an arbitrary number) may be provided to identify the vehicle. This data, along with position, velocity, acceleration, and other data (e.g., vehicle route guidance data, turn estimation data, and the like), may be transmitted to other vehicles. Thus, for example, if a vehicle is about to run a red light, this information may be electronically transmitted to other vehicles, which may warn the drivers of those vehicles and/or apply the brakes.

Alternately, such data may be used to eliminate or reduce the need for traffic lights at all. For example, if a vehicle is approaching an intersection and there is no other vehicle near that intersection, it is wasteful and inconvenient to make that vehicle stop for an arbitrary stop light. By detecting the presence of all vehicles near an intersection and calculating their velocities and time of intersection, the system can determine if it safe to pass through an intersection without stopping. If it is not safe, the car may be instructed to slow down (or speed up) to adjust its speed to avoid other vehicles, or to stop to let other traffic by.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A system for automating automobile turn and lane change signaling comprising:
    means for receiving vehicle dynamics inputs including one or more of vehicle position, velocity and acceleration;
    means for receiving driver control inputs, including one or more of pedal position, throttle position, gear shift position, and steering wheel position;
    means for retrieving stored vehicle path data;
    vehicle path estimator, coupled to the means for receiving vehicle dynamics inputs and means for receiving driver control inputs, comparing the vehicle dynamic inputs and driver control inputs to stored vehicle path data to determine a probability that the vehicle is following at least a portion of a stored vehicle path; and
    turn signal decision estimator, coupled to the vehicle path estimator and means for receiving vehicle dynamics inputs and means for receiving driver control inputs, for determining probability that at least one of a turn or lane change is to occur, and if the probability exceeds a predetermined probability threshold, outputting an output signal that a turn signal should be activated, in advance of the at least one of a turn or lane change.

2. The system of claim 1, further comprising:
    an in-dash indicator, coupled to the turn signal estimator, for receiving the output signal and activating the in-dash indicator in response to the output signal, to remind a driver that turn signal should be activated shortly; and
    a driver manual selection input, for receiving control signals from a driver to activate a turn signal,
    wherein if a driver does not activate the turn signal in response to the in-dash indicator, the vehicle path estimator adjusts the probability that the vehicle is following at least a portion of a stored vehicle path downward, and
    wherein if a driver activates the turn signal in response to the in-dash indicator, the vehicle path estimator adjusts the probability that the vehicle is following at least a portion of a stored vehicle path upward.

3. The system of claim 1, further comprising:
    an in-dash indicator, coupled to the turn signal estimator, for indicating to a driver that turn signal is to be activated shortly; and
    a driver manual selection input, for receiving control signals from a driver to override an automatically generated turn signal generated by the turn signal decision estimator,
    wherein if a driver overrides an automatically generated turn signal, the vehicle path estimator adjusts the probability that the vehicle is following at least a portion of a stored vehicle path downward, and
    wherein if a driver does not overrides an automatically generated turn signal, the vehicle path estimator adjusts the probability that the vehicle is following at least a portion of a stored vehicle path upward.

4. The system of claim 1, wherein the vehicle path estimator further receives current time and day of week data and compares current vehicle path with stored vehicle paths on similar times and days of week to determine probability that the vehicle is following a stored vehicle path.

5. The system of claim 1, wherein the vehicle path estimator further receives route guidance data from a route guidance system and estimates vehicle path from the route guidance data.

6. The system of claim 1, wherein the turn signal decision estimator receives vehicle dynamics inputs including one or more of acceleration and deceleration data, and wherein the turn signal decision estimator determines a probability that a turn is going to occur based upon one or more of acceleration and deceleration data from vehicle dynamics inputs as the vehicle approaches an intersection.

7. The system of claim 1, wherein the turn signal decision estimator receives human inputs including one or more of brake pedal action data and accelerator pedal action data, wherein the turn signal decision estimator determines a probability that a turn is going to occur based upon one or more one or more of brake pedal action data and accelerator pedal action as the vehicle approaches an intersection.

8. The system of claim 1, wherein the turn signal decision estimator receives human inputs including one or more of gear shifting, cruise control selection, and turn signal selection, wherein the turn signal decision estimator determines a probability that a turn is going to occur based upon one or more one or more of include gear shifting, cruise control selection, and turn signal selection as the vehicle approaches an intersection.

9. The system of claim 1, wherein the turn decision estimator determines when a turn has been completed and cancels a turn signal when the turn has been completed.

10. The system of claim 1, further comprising:
    means for determining deceleration and acceleration of the vehicle from one or more of the driver's use of the brake, accelerator, cruise control, and gear shifter and from acceleration and deceleration data from vehicle dynamics sensors; and
    means for indicating acceleration and deceleration of the vehicle using lights on the front and rear of the vehicle.

11. The system of claim 1, further comprising:
a broadcasting system for broadcasting vehicle intent to nearby vehicles and other users using over a data link.

12. A method for automating automobile turn and lane change signaling comprising the steps of:
receiving vehicle dynamics inputs including one or more of vehicle position, velocity and acceleration,
receiving driver control inputs, including one or more of pedal position, throttle position, gear shift position, and steering wheel position,
retrieving stored vehicle path data,
comparing, in vehicle path estimator, the vehicle dynamic inputs and driver control inputs to stored vehicle path data to determine a probability that the vehicle is following at least a portion of a stored vehicle path, and
determining, in a turn signal decision estimator, a probability that at least one of a turn or lane change is to occur, and if the probability exceeds a predetermined probability threshold, outputting an output signal that a turn signal should be activated, in advance of the at least one of a turn or lane change.

13. The method of claim 12, further comprising the steps of:
receiving the output signal in an in-dash indicator coupled to the turn signal estimator, and activating the in-dash indicator in response to the output signal to remind a driver that turn signal should be activated shortly, and
receiving, in a driver manual selection input, control signals from a driver to activate a turn signal,
wherein if a driver does not activate the turn signal in response to the in-dash indicator, the vehicle path estimator adjusts the probability that the vehicle is following at least a portion of a stored vehicle path downward, and
wherein if a driver activates the turn signal in response to the in-dash indicator, the vehicle path estimator adjusts the probability that the vehicle is following at least a portion of a stored vehicle path upward.

14. The method of claim 12, further comprising:
receiving the output signal in an in-dash indicator coupled to the turn signal estimator and indicating to a driver that turn signal is to be activated shortly, and
receiving, in a driver manual selection input, control signals from a driver to override an automatically generated turn signal generated by the turn signal decision estimator,
wherein if a driver overrides an automatically generated turn signal, the vehicle path estimator adjusts the probability that the vehicle is following at least a portion of a stored vehicle path downward, and
wherein if a driver does not overrides an automatically generated turn signal, the vehicle path estimator adjusts the probability that the vehicle is following at least a portion of a stored vehicle path upward.

15. The method of claim 12, further comprising the steps of:
receiving in the vehicle path estimator, current time and day of week data, and
comparing, in the vehicle path estimator, current vehicle path with stored vehicle paths on similar times and days of week to determine probability that the vehicle is following a stored vehicle path.

16. The method of claim 12, further comprising the steps of:
receiving, in the vehicle path estimator, route guidance data from a route guidance system, and
estimating, in the vehicle path estimator, vehicle path from the route guidance data.

17. The method of claim 12, further comprising the steps of:
receiving, in the turn signal decision estimator, vehicle dynamics inputs including one or more of acceleration and deceleration data, and
determining, in the turn signal decision estimator, a probability that a turn is going to occur based upon one or more of acceleration and deceleration data from vehicle dynamics inputs as the vehicle approaches an intersection.

18. The method of claim 12, further comprising the steps of:
receiving, in the turn signal decision estimator, human inputs including one or more of brake pedal action data and accelerator pedal action data, and
determining, in the turn signal decision estimator, a probability that a turn is going to occur based upon one or more one or more of brake pedal action data and accelerator pedal action as the vehicle approaches an intersection.

19. The method of claim 12, further comprising the steps of:
receiving, in the turn signal decision estimator, human inputs including one or more of gear shifting, cruise control selection, and turn signal selection, and
determining, in the turn signal decision estimator, wherein the turn signal decision estimator determines a probability that a turn is going to occur based upon one or more one or more of include gear shifting, cruise control selection, and turn signal selection as the vehicle approaches an intersection.

20. The method of claim 12, further comprising the steps of:
determining, in the turn decision estimator, when a turn has been completed, and
canceling a turn signal when the turn has been completed.

21. The method of claim 12, further comprising the steps of:
determining deceleration and acceleration of the vehicle from one or more of the driver's use of the brake, accelerator, cruise control, and gear shifter and from acceleration and deceleration data from vehicle dynamics sensors; and
indicating acceleration and deceleration of the vehicle using lights on the front and rear of the vehicle.

22. The method of claim 12, further comprising the step of:
broadcasting vehicle intent to nearby vehicles and other users using over a data link.

* * * * *